(12) United States Patent
Ward et al.

(10) Patent No.: US 7,388,464 B2
(45) Date of Patent: Jun. 17, 2008

(54) LOCATION SYSTEM AND COMMUNICATION

(75) Inventors: Andrew Martin Robert Ward, Cambridge (GB); Stephen Edward Hodges, Cambridge (GB); Peter Joseph Steggles, Cambridge (GB); Rupert William Meldrum Curwen, Royston (GB); Joseph Francis Newman, Cambridge (GB)

(73) Assignee: AT&T Corp., New York, NY (US)

( * ) Notice: Subject to any disclaimer, the term of this patent is extended or adjusted under 35 U.S.C. 154(b) by 340 days.

(21) Appl. No.: 10/468,690

(22) PCT Filed: Feb. 19, 2002
(Under 37 CFR 1.47)

(86) PCT No.: PCT/GB02/00718

§ 371 (c)(1),
(2), (4) Date: Dec. 22, 2004

(87) PCT Pub. No.: WO02/067009

PCT Pub. Date: Aug. 29, 2002

(65) Prior Publication Data
US 2006/0202801 A1    Sep. 14, 2006

(30) Foreign Application Priority Data
Feb. 21, 2001    (GB)    ................................. 0104204.3

(51) Int. Cl.
*G05B 23/02*    (2006.01)
*H04Q 5/22*    (2006.01)

(52) U.S. Cl. .................... 340/3.41; 340/10.2; 340/10.31
(58) Field of Classification Search ................ 340/3.41, 340/10.2, 10.31, 10.4, 10.52; 370/462, 314, 370/311; 235/435, 492; 375/224
See application file for complete search history.

(56) References Cited

U.S. PATENT DOCUMENTS

| | | | |
|---|---|---|---|
| 3,714,650 A | | 1/1973 | Fuller et al. |
| 5,126,733 A | * | 6/1992 | Sagers et al. ................ 340/7.21 |
| 5,307,349 A | * | 4/1994 | Shloss et al. ................ 370/442 |
| 5,591,951 A | * | 1/1997 | Doty .......................... 340/10.3 |
| 5,742,592 A | * | 4/1998 | Scholefield et al. ......... 370/329 |
| 5,929,779 A | * | 7/1999 | MacLellan et al. .......... 340/10.2 |
| 6,493,649 B1 | * | 12/2002 | Jones et al. ................. 702/150 |
| 6,611,556 B1 | * | 8/2003 | Koerner et al. .............. 375/224 |

FOREIGN PATENT DOCUMENTS

| | | |
|---|---|---|
| GB | 2 277 152 A | 10/1994 |
| GB | 2 320 089 A | 6/1998 |
| GB | 2 360 356 A | 9/2001 |

* cited by examiner

*Primary Examiner*—Brian Zimmerman
*Assistant Examiner*—Nam Nguyen (57) ABSTRACT

A location system comprises a plurality of transponders whose locations are detectable by a base system. The base system interrogates (51-55) the transponders one at a time in accordance with a schedule of consecutive time slots. In response to a priority request received (53) from one of the transponders, the base system interrupts the schedule and interrogates substantially immediately (56,57,55) the signalling transponder so as to determine its location with minimal latency.

29 Claims, 6 Drawing Sheets

FIG_2

LOCATION SYSTEM AND COMMUNICATION

The present invention relates to a location system and to a time-division multiplex communication system.

GB 2320089A, the contents of which are incorporated herein by reference, discloses a location system which comprises a base system and a plurality of transponders. The transponders comprise devices which may be carried by personnel or fixed to objects within an environment, such as an office. Each transponder is allocated a unique address and comprises a radio receiver for receiving polling signals from the base system. When the transponder receives a polling signal containing its address, it responds by emitting a burst of ultrasonic energy.

The base system comprises a plurality of acousto-electric transducers distributed around and fixed in the environment. When any of the transducers receives an ultrasonic signal from a transponder, this is sent to a processor of the base system for determining and registering the location of the transponder currently being polled. The processor determines the position of each transponder on the basis of the time taken for the ultrasonic energy to propagate from the transponder to the transducers which detected the ultrasonic energy.

The base system polls the transponders in accordance with a sequence with each transponder being polled in a time slot of finite duration. The polling signal is propagated electromagnetically and its propagation time from the base system to each transponder is so short in comparison with the speed of propagation of ultrasonic energy that it can be ignored. Each time slot must be sufficiently long to allow for the ultrasonic energy to propagate to all of the transducers within range and for the ultrasonic energy to decay below a threshold so as to avoid confusion with detection of the next ultrasonic burst. In a typical system, 40 milliseconds is sufficient to avoid false detection so that each time slot is 40 milliseconds in duration and hence the transducers can be polled at a maximum rate of 25 per second. There is thus a finite limit to the rate at which any transducer can be polled.

Transducers which are attached to inanimate objects, such as furniture, computers and the like, are unlikely to be moved frequently or rapidly. Accordingly, it is unnecessary, and would therefore be wasteful of resources, to poll such transducers at a relatively high rate. However, transducers worn by personnel are likely to move more often so that it is necessary to poll such transducers more frequently in order to track the location of personnel. Thus, whereas it may be desirable to track transducers worn by personnel at a rate which is typically once per second, transducers attached to inanimate objects may be polled much less frequently, for example at intervals of tens of seconds.

Figure 1:
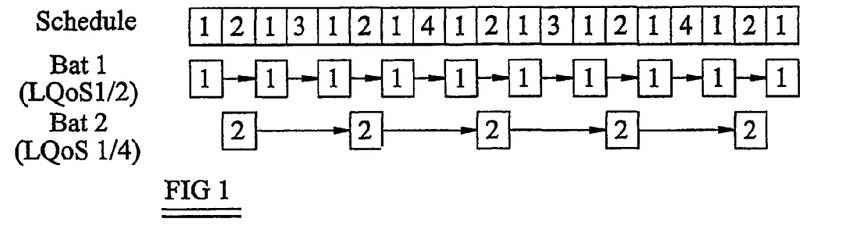
FIG. 1 illustrates a known schedule for polling transponders in a known type of location system.

GB 2320089 discloses a scheduling technique based on assigning to each transponder a location quality of service (LQoS) parameter or value which indicates how frequently the transponder should be polled. FIG. 1 of the accompanying drawings illustrates a simplified polling schedule for a small location system comprising a base system and four transponders. A first transponder (Bat 1) is given an LQoS of half, which indicates that Bat 1 should be polled or located in every second time slot. Another transponder (Bat 2) is assigned an LQoS of a quarter indicating that it should be polled and located in every fourth time slot. The other two transponders have a default value, in this case one eighth, of LQoS so as to fill the schedule.

The polling schedule polls the transducers in the order "Bat 1, Bat 2, Bat 1, Bat 3, Bat 1, Bat 2, Bat 1, Bat 4" and repeats this sequence continuously unless and until there is a change in the LQoS value assigned to any of the transducers.

It would be possible to exceed the capacity of such a system if too many transducers were assigned too high values of LQoS. In order to avoid such a situation, which might give rise to one or more of the transducers never being polled, the LQoS values are scaled so as to ensure that the polling capacity of the system is never exceeded.

Such a scheduling technique works well for many applications, particularly for those which require a steady stream of location updates for transducers over a long period of time. An example of such an application is telephone-call-forwarding, which needs to know where each person wearing a transducer is located to a sufficient resolution such that telephone calls for each person can be directed to the nearest telephone. Such a system needs to know where each person is at any time throughout the day and polling each transducer worn by personnel every second provides sufficient location information for the telephone-call-forwarding application to work satisfactorily.

There are some applications were such a polling sequence does not provide adequate information for correct or convenient running of the application. For example, GB 2 360 356, the contents of which are incorporated herein by reference, discloses an arrangement for providing, among other things, "virtual buttons". In a typical example of such an application, a region of space is allocated as a virtual light switch for controlling room lighting. Each transponder has a manually operated button which causes the transponder to transmit a radio message to the base system. A transponder may be placed in the region of space for controlling the room lighting and its button actuated so as, for example, to change the state of the room lighting by toggling between on and off conditions.

Unlike applications which require a stream of location measurements, for example a few seconds apart, such virtual button applications require infrequent locations with a very low latency after the transponder button has been actuated so that the system can respond sufficiently quickly for the particular application being controlled.

This may be achieved by assigning to transponders which may control virtual buttons a very high LQoS value so that such transponders would be located shortly after their buttons had been actuated. However, such a schedule would have the disadvantage that large amounts of location resources would be continuously allocated to such transponders in case they might actually be used to control a virtual button at some point in time. Also, assigning high LQoS values to a substantial number of transponders would result in scaling down of all of the transponder LQoS values so as to avoid exceeding the capacity of the location system.

According to a first aspect of the invention, there is provided a location system comprising a plurality of devices, each of whose locations is detectable, and a base system for detecting and registering the locations of the devices, the base system being arranged to interrogate the locations of the devices one at a time in a sequence of time slots so that the location of each device is repeatedly interrogated and to interrogate the location of any one of at least some of the devices substantially immediately in response to a signal from the one device.

The base system may be arranged to interrogate the location of the one device in the first time slot to start after receipt of the signal from the one device.

The signal from the one device may be a manually actuable signal.

The signal from the one device may be an electromagnetic signal, such as a radio signal. Each of the devices may comprise a transponder arranged to transmit a response to receipt of a polling signal from the base system. The response may be an ultrasonic signal. The base system may comprise a plurality of fixed ultrasonic transducers and a processor for determining the position of each device from the propagation times of ultrasonic energy from the device to each of at least some of the transducers.

The polling signal may be an electromagnetic signal, such as a radio signal.

The location of each device may be detectable anywhere within a predetermined region of space.

The sequence of time slots may be delayed by a time slot following the or each substantially immediate interrogation. As an alternative, the or each substantially immediate interrogation may replace interrogation of another of the devices which would have been interrogated in the absence of the signal from the one device.

According to a second aspect of the invention, there is provided a time-division multiplex communication system comprising a scheduler for scheduling a plurality of messages for transmission and for transmitting substantially immediately a priority message in response to a request generated externally of the communication system.

The scheduler may be arranged to transmit the priority message in a first time slot beginning after receipt of the request.

The priority message may be generated externally of the communication system.

The communication system may comprise an asynchronous system. Each message may comprise a data packet having a header containing destination information.

It is thus possible to provide a location system which is capable of locating a device with low latency when a signal requesting such a location update is received from the device. Although the updating may be performed in the next time slot following receipt of the request, this may not always be necessary and it may be sufficient to locate the device within a few time slots of receipt of the signal from the device. This low latency updating of location measurement has little substantial effect on locating other devices which have not requested an immediate update and so provides minimum interference with scheduling of those devices which have not requested an immediate update. The present invention may therefore be used in combination with the techniques disclosed in GB 2320089A so as to optimise the use of the location resources available in any system while also providing the facility for a low latency location update.

Such an arrangement is suitable for applications requiring a rapid response, for example such as the virtual button techniques disclosed in GB 2 360 356. When any of the devices is used to actuate a virtual button, it is possible to arrange for such actuation to occur with a very small or imperceptible latency. For example, when changing the state of room lighting, it would generally be considered undesirable or at least inconvenient to have to wait a few seconds for the room lighting status to be changed. Such problems can be substantially overcome or greatly eliminated by means of the present technique.

The present invention will be further described, by way of example, with reference to the accompanying drawings, in which.

Figure 2:
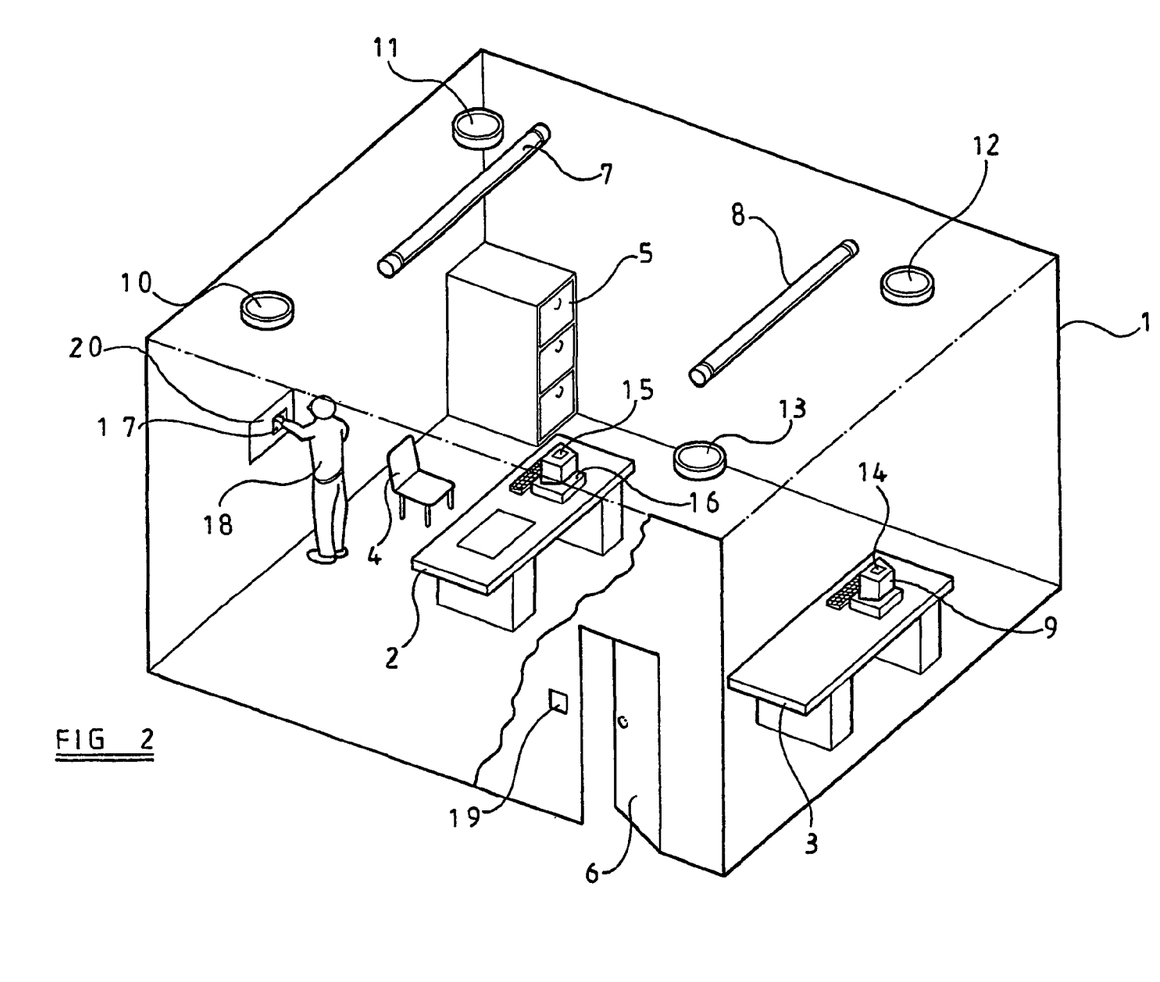
FIG. 2 illustrates a location system constituting an embodiment of the invention deployed in an office environment.

FIG. 2 illustrates a room 1 forming part of an office environment or other environment provided with a transponder location system. This is a typical example of a three dimensional space about which personnel may move relatively freely, for example about the room 1 and from room to room of the whole environment. For the sake of simplicity, only a single room of the environment is illustrated.

The room contains furniture illustrated as tables 2 and 3, a chair 4 and a filing cabinet 5. Freedom of movement of personnel is limited only by the need to avoid such obstacles and the walls defining the room 1. The room is also provided with fixtures and fittings exemplified by a door 6 and overhead lighting in the form of individual lights 7 and 8.

The room also contains part of a transponder location system. This system comprises a computer 9 connected by any suitable communication link, such as wiring, to ceiling-mounted transducers 10 to 13 which convert ultrasonic acoustic energy into corresponding electrical signals and supply these signals to the computer 9.

The system comprises a plurality of transponders which are actuated in turn by the computer 9 over a radio communication link and which respond by emitting a pulse of ultrasonic energy. For example, transponders 14 and 15 are located on and associated with the computer 9 and another computer or terminal 16 forming part of a local area network served by the computer 9. The locations of such transponders 14 and 15 do not, in general, vary frequently with time. However, these transponders serve to determine the locations of the apparatuses to which they are attached.

Other transponders, such as that illustrated at 17, are carried by personnel such as a user 18. The positions of these transducers 17 thus vary with time according to the location of each user within the room 1.

FIG. 2 illustrates a conventional fixed light switch 19 disposed adjacent the opening for the door 6 and arranged to switch on and off the overhead lighting comprising the lights 7 and 8. FIG. 1 also illustrates a region 20 which is selected and registered with the base system as a virtual button for controlling the room lighting in accordance with the techniques disclosed in GB 2 360 356. Thus, when the user 18 places the transponder 17 at or in the region 20 and manually actuates the transponder 17, the base system toggles the state of the room lighting provided by the lights 7 and 8.

Figure 3:
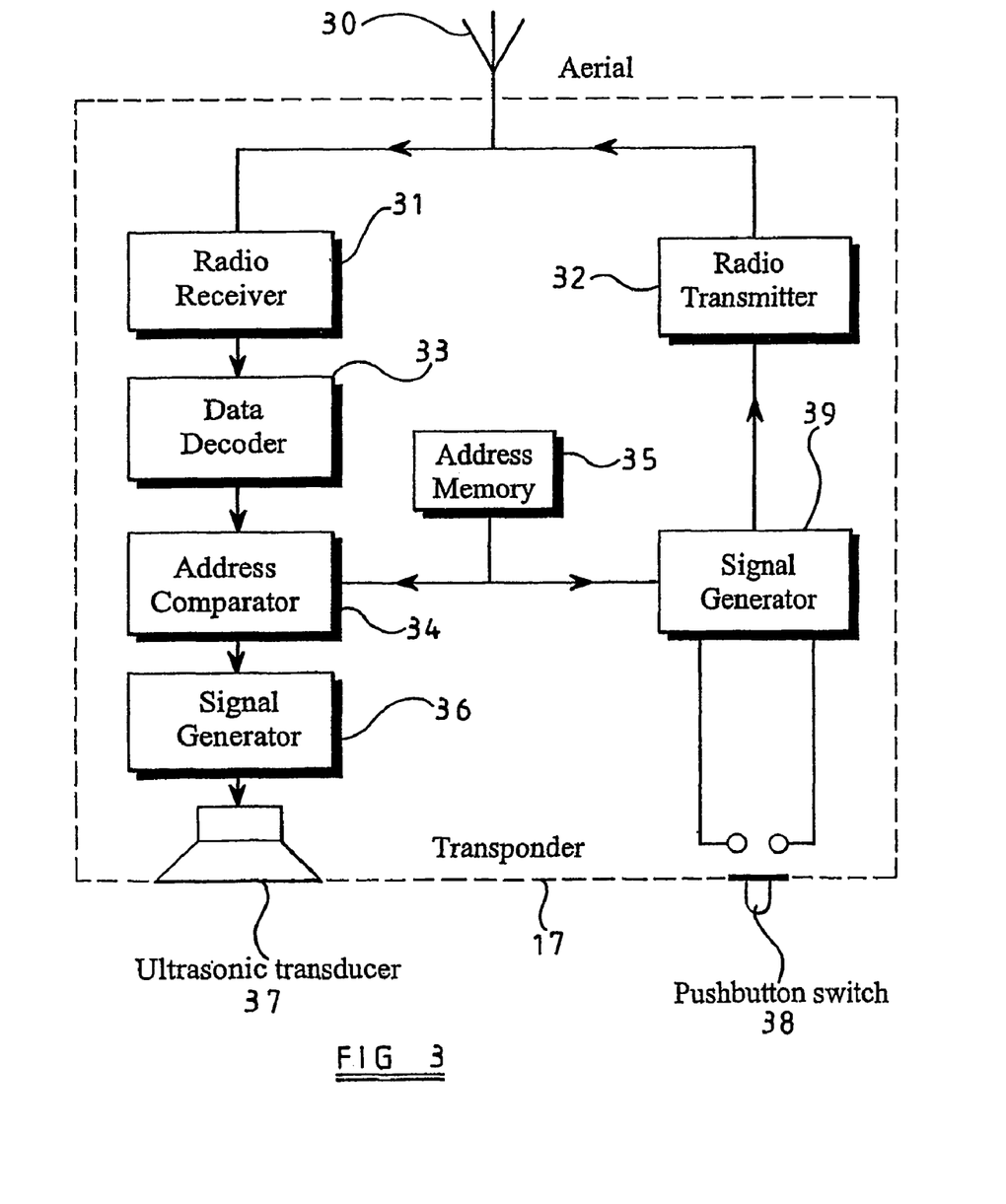
FIG. 3 is a block schematic diagram of a transponder of the location system of FIG. 2.

As shown in FIG. 3, the transponder 17 comprises a radio aerial 30 connected to and shared by a radio receiver 31 and a radio transmitter 32. The aerial 30 receives transponder polling signals from the base system and these are processed by the radio receiver 31 to supply the data carried by the radio signals to a data decoder 33 which extracts transponder addresses from the signal. An address comparator 34 compares each address with the address of the particular transponder stored in an address memory 35. When the received address is that of the transponder, the comparator 34 actuates a signal generator 36 which energises an ultrasonic transducer 37 to emit a pulse or burst of ultrasonic energy.

The transponder 17 comprises a manually operable push button switch 38 which, when manually actuated, causes a signal generator 39 to generate a signal based on the address of the transponder contained in the memory 35. The generated signal is supplied to the radio transmitter 32 which transmits, via the aerial 30, a priority request to the base system.

Figure 4:
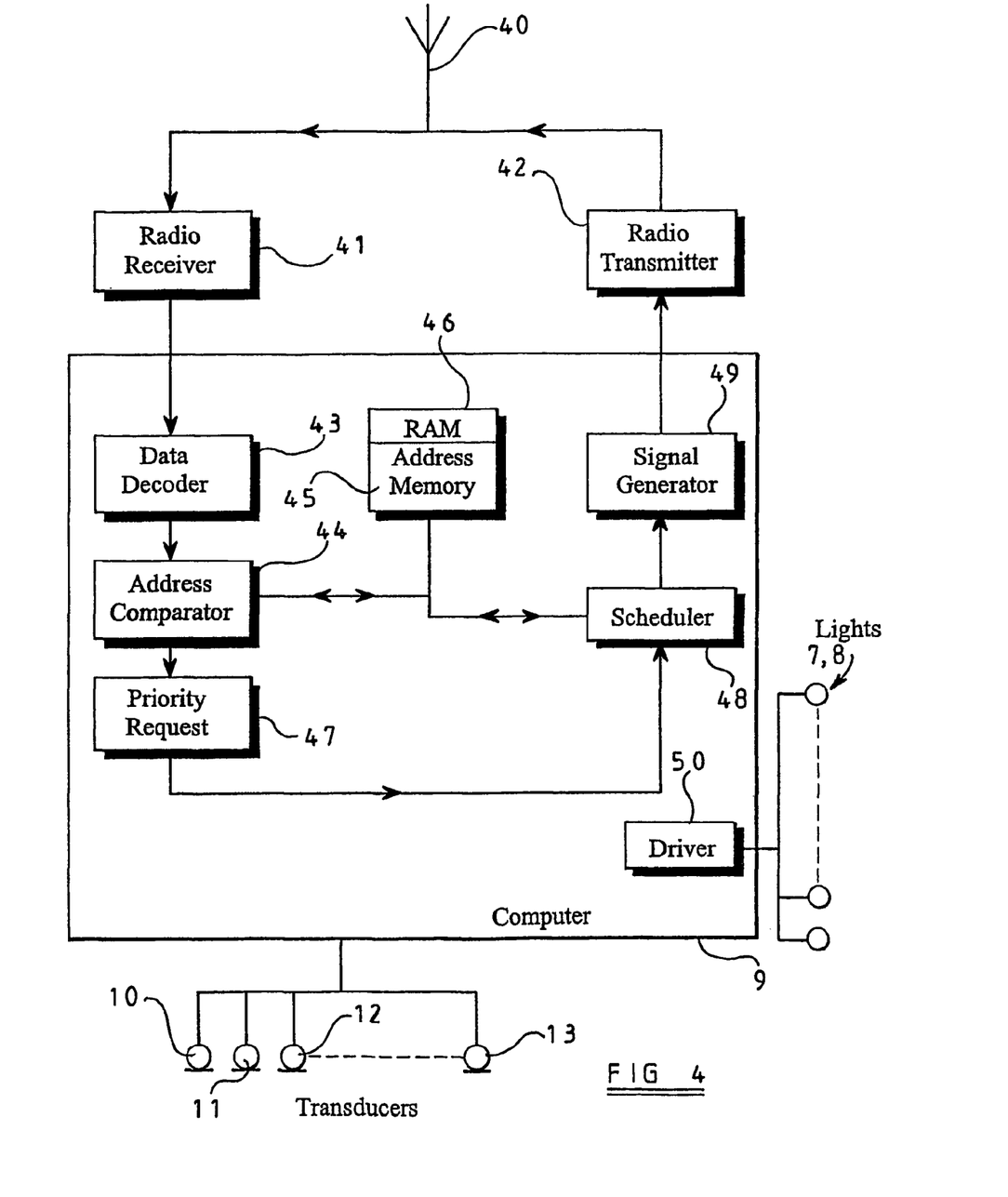
FIG. 4 is a block schematic diagram of a base system of the location system of FIG. 2.

FIG. 4 shows in more detail the base system comprising the computer 9 for controlling the lights 7, 8 and the transducers 10 to 13. The base system comprises a radio aerial 40 connected to and shared by a radio receiver 41 and a radio transmitter 42. FIG. 4 illustrates schematically part of the structure and operation of the computer 9 for handling the priority requests from the transponders 17.

The output of the radio receiver 41 is supplied to a data decoder 43 which decodes data transmitted from the transponders and supplies transponder addresses from received signals to an address comparator 44. When the address comparator 44 receives a transponder address, it compares this with the addresses of some or all of the transponders registered in an address memory 45 of a random access memory (RAM) 46 of the computer 9. If a match is found, a block 47 instructs a priority request to a scheduler 48 which, as described in more detail hereinafter, responds by interrupting the usual schedule and requesting immediate polling to determine the location of the transponder making the priority request. A signal generator 49 generates the polling signal for the transponder and this is transmitted by the transmitter 42 via the aerial 40.

In the absence of priority requests from any of the transponders, the base system operates in accordance with the system disclosed in GB 2320089A to poll the transponder in accordance with a schedule of the type illustrated in FIG. 1 with the frequency of polling of each transponder being determined by a location quality of service parameter value. The base system is also arranged, in this example, to control the lights 7,8 by means of an appropriate driver 50 in accordance with the virtual button technique as disclosed in GB 2 360 356.

Figure 5:
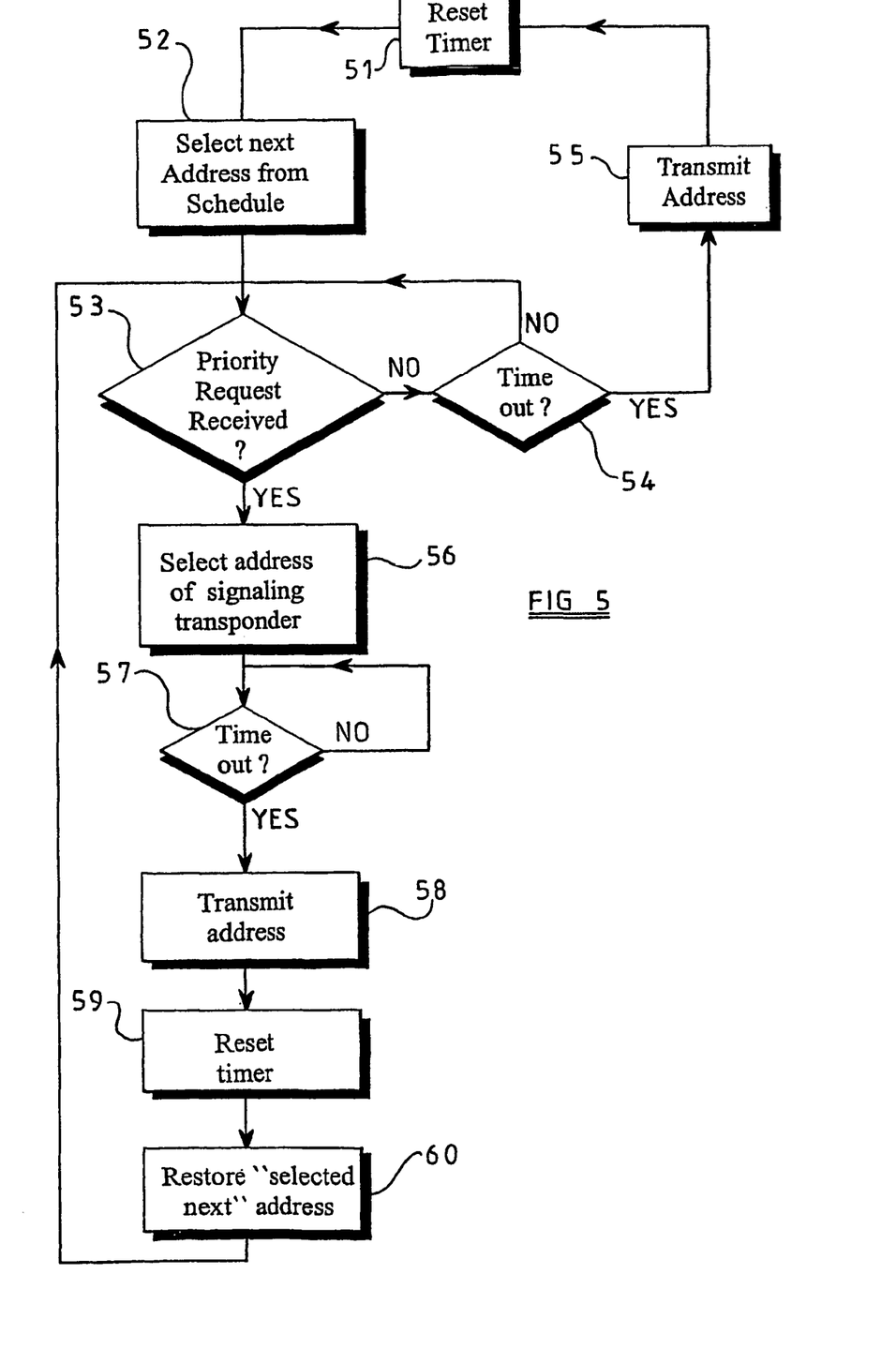
FIG. 5 is a flow diagram illustrating a first mode of operation of the location system of FIG. 2.

One mode of operation of the location system is illustrated in FIG. 5 in the form of a flow diagram which illustrates how the base system shown in FIG. 4 responds to a priority request. A timer is reset at a step 51 and a step 52 selects the next address from the schedule for polling the next transducer in accordance with the "old schedule" illustrated in FIG. 6, which is identical to the schedule illustrated in FIG. 1. A step 53 determines whether a priority request has been received and, if not, a step 54 determines whether the timer has timed out. The steps 53 and 54 are repeated until either a priority request is received or the timer times out if no priority request is received in the time slot. When the timer times out, the address selected from the "old schedule" is transmitted in a step 55. The reset timer step 51 is then repeated and this cycle of operation is repeated until a priority request is received.

When, for example, the user 18 places his transponder 17 at the region 20 which has been registered as a virtual button for controlling the room lighting and the user 18 actuates the transponder 17 by actuating the switch 38, the signal generator 39 generates a priority request signal based on the address stored in the memory 35 and comprising the address identifying the particular transponder 17 in the polling schedule. The priority request signal is transmitted by the transmitter 32 and the aerial 30 to the aerial 40 of the base system. This is detected by the receiver 41, decoded by the decoder 43 and the resulting address is compared by the address comparator 44 with each of the addresses stored in the memory 45 and representing transponders which are permitted to operate the room lighting. For example, all of the transponders may be permitted to affect the room lighting or only some of the transponders, such as those carried by personnel, may be registered in the memory 45 for this purpose.

Figure 6:
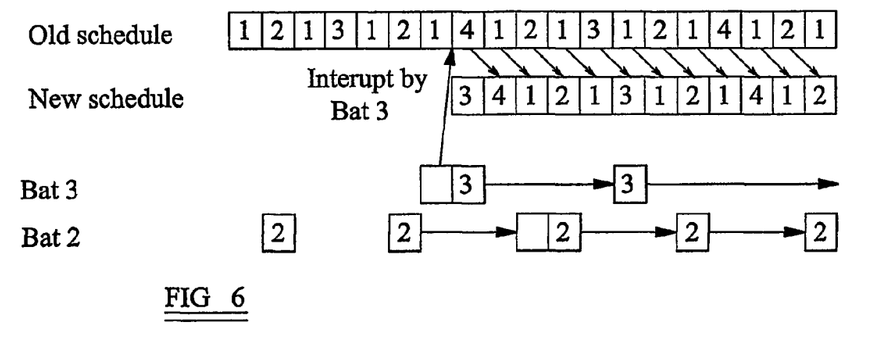
FIG. 6 illustrates a polling schedule performed by the first mode of operation.

When the step 53 detects that a priority request has been received, a step 56 selects the address of the signalling transponder which made the priority request, for example by retrieving the relevant address from the memory 45 and supplying it to the scheduler 48. A step 57 effectively causes the base system to wait until the present time slot has been completed and then causes, in a step 58, the polling signal for the transponder which made the priority request to be inserted into the schedule so as to create a "new schedule" as shown in FIG. 6. For the four transponder or "Bat" system whose scheduling is illustrated in FIG. 1, it is assumed that Bat 3 has made the priority request. Thus, in the next available time slot, the location polling signal for Bat 3 is transmitted. The old schedule is therefore effectively interrupted in order to form location detection of Bat 3 as quickly as possible.

When the Bat 3 address has been transmitted, a step 59 resets the timer and a step 60 restores the address which was selected in the preceding step 52. Control returns to the step 53 so that, in the absence of any further priority requests at least for time being, the previous or old schedule is restored to the new schedule but with each Bat or transponder being polled one time slot later than it would have been according to the old schedule. This one time slot delay is illustrated for Bats 2 and 3 in FIG. 6.

The base system thus detects the location of the transponder 17 substantially immediately after receiving a request from the transponder corresponding to actuation of the switch 38 by the user 18. The base system responds to this by toggling the state of the lights 7, 8 between the on and off conditions. Thus, the user 18 can operate the room lighting with a minimum or imperceptible latency.

Although operation has been described for a system which responds to a priority request by polling the requesting transponder in the first time slot to start after receipt of the request, this may not be essential depending on the specific application of the system. If it necessary or convenient for the polling of the signalling transponder to be delayed by one or more time slots, this may provide a sufficiently low latency for some applications. Thus, it is merely required that the base system response to the priority request be sufficiently rapid to provide a sufficiently low latency response for the particular application being controlled by a virtual button or the like.

Figure 7:
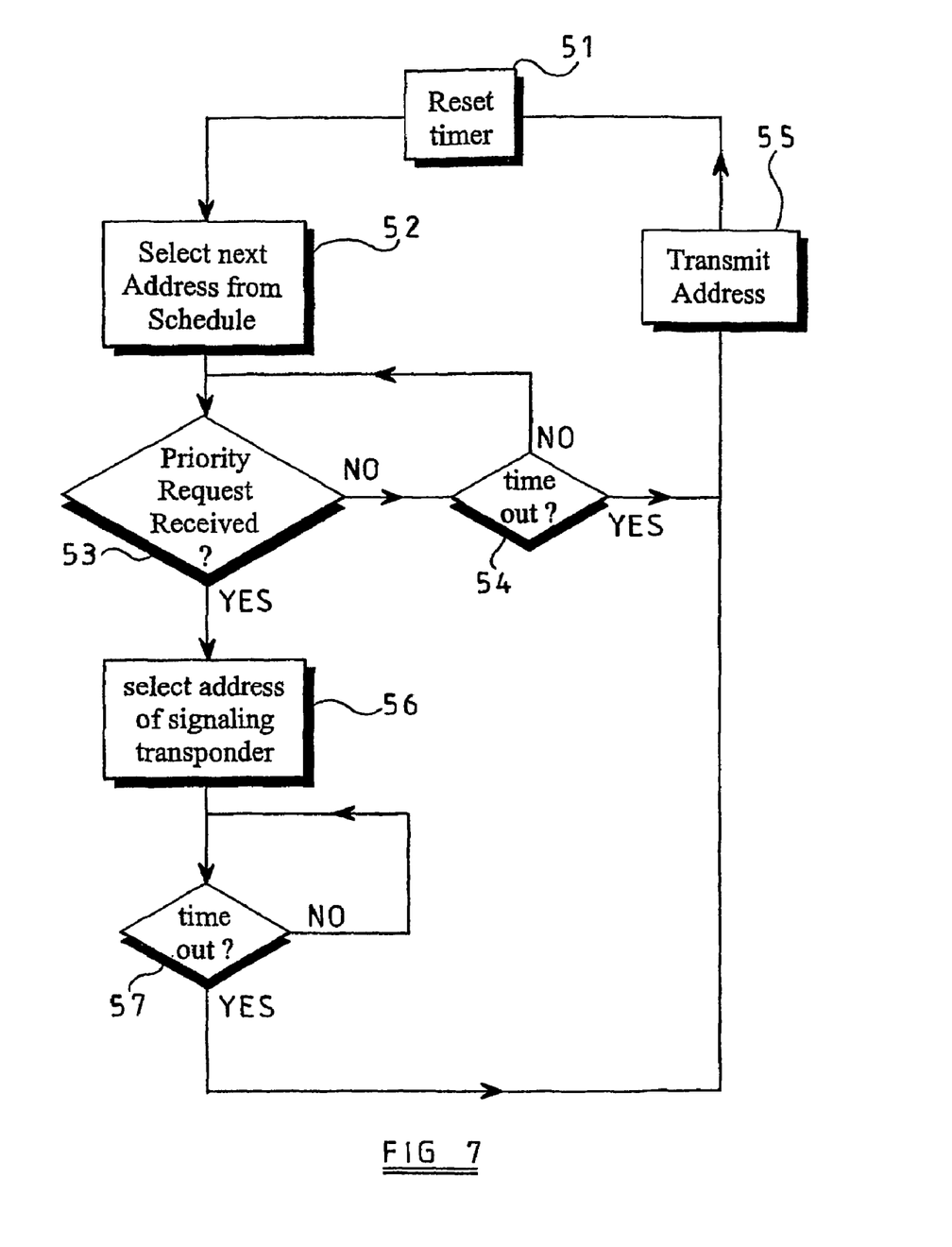
FIG. 7; is a flow diagram illustrating a second mode of operation of the location system of FIG. 2.
Figure 8:
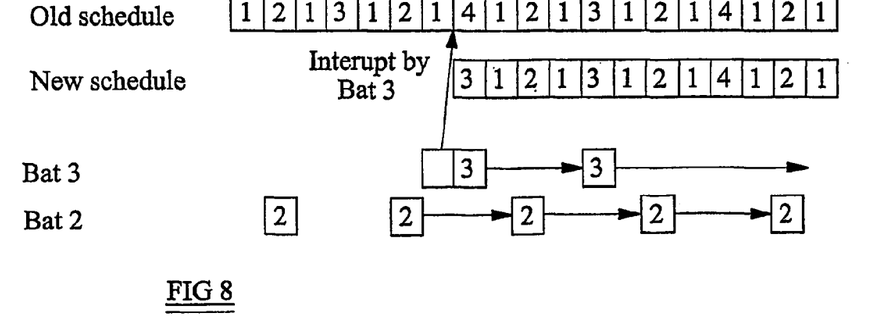
FIG. 8 illustrates a polling schedule performed by the second mode of operation.

FIG. 7 illustrates a simplified mode of operation as compared with the mode illustrated in FIG. 5. As shown in FIG. 7, the steps 51 to 57 are the same as the corresponding steps in FIG. 5. However, after the step 57, control returns to the step 55. The effect of this is illustrated in FIG. 8, which shows the corresponding "old schedule", (which is the same as illustrated in FIG. 1), the resulting "new schedule" following receipt of a priority request from Bat 3, and the subsequent scheduling of the Bats 2 and 3. In this case, when a priority request is received from Bat 3, it is polled in the next time slot by the steps 56, 57 and 55. Instead of then returning to the old schedule but delayed by a time slot, polling of the Bat 4 which was selected in the preceding step 52 is replaced by the immediate polling of the Bat 3, after which the new schedule is identical to the old schedule unless and until a further priority request is received.

Such a simplified schedule may be performed in cases where it is acceptable for polling of any of the transponders to be delayed by one complete polling cycle for the transponder. However, if it is desirable or essential for such delays to be avoided, then the schedule illustrated in FIG. 6 performed by the mode of operation illustrated in FIG. 5 should be used.

The location system described hereinbefore may be considered as a specific and non-obvious application of a more general technique which may be employed in any time division multiplex system, such as an asynchronous system. In a typical asynchronous system, data to be transmitted are formed into data payloads of data packets, which are assembled with headers containing destination address data before transmission over any type of network or communication system. A schedule for transmission of such packets is created, for example merely by transmitting such packets in the order of receipt of the payload data.

When such packets are received at any point within the network, they may be consumed or forwarded as appropriate. For example, each application running on a computer of the network checks the header of each packet which it receives to determine whether the packet is intended for that application. If so, the data payload is read into the application, which constitutes its destination. If the header in the address does not correspond to that destination, then the packet is ignored or may be forwarded through the network.

In applications where it is required to respond to a stimulus, which for example may be external to the communication system or network, scheduling of transmission may be interrupted in the manner described hereinbefore so as to insert a packet into the order of transmission at the earliest opportunity. For example, when data payloads of complete packets have been scheduled for transmission in succeeding time slots, receipt of an external stimulus can cause a packet to be formed and transmitted substantially immediately, for example in the next time slot, so as to provide a low latency response to such a stimulus. In general, a mode of operation corresponding to that illustrated in FIGS. 5 and 6 is necessary to ensure that no packets are lost because of the interruption in the normal or old schedule.

A particular example of such a communication system is a system which delivers share price information from a base station to pagers owned by subscribers over an asynchronous time division multiplex radio channel. Each pager has a unique address and each time slot contains the address of a pager and the current share price information for the associated subscriber.

Day traders can pay a higher subscription so as to be informed more often of their current share prices and a scheduling process allocates time slots on the radio channel to investors based on the level of subscription paid by such investors so as to ensure fair allocation of the system resources.

It is possible to offer a premium service, which may not be available for everyone but which may be made available to nervous small-scale traders who wish to take advantage of a stock-crash feature and for which they pay a small additional fee. Thus, if the value of a stock in an investor's portfolio falls to less than, for example, half of what they paid for it, the scheduler allocates the next available time slot to that investor so that they may be informed of a market catastrophe with minimal latency, thus allowing the investor to sell the investment immediately.

The invention claimed is:

1. A location system comprising a plurality of devices, each of whose locations is detectable, and a base system for detecting and registering the locations of the devices, the base system being arranged to interrogate the locations of the devices one at a time in a sequence of time slots so that the location of each device is repeatedly interrogated and to interrogate the location of any one of at least some previously interrogated devices substantially immediately in response to a priority request radio signal from that same device, each of the devices comprising a transponder arranged to transmit an ultrasonic signal in response to receipt of a polling signal from the base system.

2. A location system as claimed in claim 1, in which the base system is arranged to interrogate the location of that same device in the first time slot to start after receipt of the signal from that same device.

3. A location system as claimed in claim 1, in which the signal from that same device is a manually actuable signal.

4. A location system as claimed in claim 1, in which the base system comprises a plurality of fixed ultrasonic transducers and a processor for determining the position of each device from the propagation times of ultrasonic energy from the device to each of at least some of the transducers.

5. A location system as claimed in claim 1, in which the polling signal is an electromagnetic signal.

6. A location system as claimed in claim 5, in which the electromagnetic signal is a radio signal.

7. A location system as claimed in claim 1, in which the location of each device is detectable anywhere within a predetermined region of space.

8. A location system comprising a plurality of devices, each of whose locations is detectable, and a base system for detecting and registering the locations of the devices, the base system being arranged to interrogate the locations of the devices one at a time in a sequence of time slots so that the location of each device is repeatedly interrogated and to interrogate the location of any one of at least some previously interrogated devices substantially immediately in response to a priority request signal from that same device, the sequence of time slots being delayed by a time slot following the or each substantially immediate interrogation.

9. A location system as claimed in claim 8, in which the base system is arranged to interrogate the location of that same device in the first time slot to start after receipt of the signal from that same device.

10. A location system as claimed in claim 8, in which the signal from that same device is a manually actuable signal.

11. A location system as claimed in claim 8, in which the signal from that same device is an electromagnetic signal.

12. A location system as claimed in claim 11, in which the electromagnetic signal is a radio signal.

13. A location system as claimed in claim 8, in which each of the devices comprises a transponder arranged to transmit a response to receipt of a polling signal from the base system.

14. A location system as claimed in claim 13, in which the response is an ultrasonic signal.

15. A location system as claimed in claim 14, in which the base system comprises a plurality of fixed ultrasonic transducers and a processor for determining the position of each device from the propagation times of ultrasonic energy from the device to each of at least some of the transducers.

16. A location system as claimed in claim 13, in which the polling signal is an electromagnetic signal.

17. A location system as claimed in claim 16, in which the electromagnetic signal is a radio signal.

18. A location system as claimed in claim 8, in which the location of each device is detectable anywhere within a predetermined region of space.

19. A location system comprising a plurality of devices, each of whose locations is detectable, and a base system for detecting and registering the locations of the devices, the base system being arranged to interrogate the locations of the devices one at a time in a sequence of time slots so that the location of each device is repeatedly interrogated and to interrogate the location of any one of at least some of the devices substantially immediately in response to a priority request signal from that same device, the or each substantially immediate interrogation replacing interrogation of another of the devices which would have been interrogated in the absence of the signal from that same device.

20. A location system as claimed in claim 19, in which the base system is arranged to interrogate the location of that same device in the first time slot to start after receipt of the signal from that same device.

21. A location system as claimed in claim 19, in which the signal from that same device is a manually actuable signal.

22. A location system as claimed in claim 19, in which the signal from that same device is an electromagnetic signal.

23. A location system as claimed in claim 22, in which the electromagnetic signal is a radio signal.

24. A location system as claimed in claim 19, in which each of the devices comprises a transponder arranged to transmit a response to receipt of a polling signal from the base system.

25. A location system as claimed in claim 24, in which the response is an ultrasonic signal.

26. A location system as claimed in claim 25, in which the base system comprises a plurality of fixed ultrasonic transducers and a processor for determining the position of each device from the propagation times of ultrasonic energy from the device to each of at least some of the transducers.

27. A location system as claimed in claim 24, in which the polling signal is an electromagnetic signal.

28. A location system as claimed in claim 27, in which the electromagnetic signal is a radio signal.

29. A location system as claimed in claim 19, in which the location of each device is detectable anywhere within a predetermined region of space.

* * * * *